(12) United States Patent
Chamas et al.

(10) Patent No.: US 6,930,617 B2
(45) Date of Patent: Aug. 16, 2005

(54) METHODS AND APPARATUS FOR AIRSPACE NAVIGATION

(75) Inventors: Bassam H. Chamas, Redondo Beach, CA (US); Ryuichi Yokota, Rolling Hills Estates, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 521 days.

(21) Appl. No.: 09/986,444

(22) Filed: Nov. 8, 2001

(65) Prior Publication Data

US 2002/0053983 A1 May 9, 2002

Related U.S. Application Data

(60) Provisional application No. 60/246,607, filed on Nov. 8, 2000.

(51) Int. Cl.⁷ .............................................. G08B 21/00
(52) U.S. Cl. ...................................... 340/945; 340/975
(58) Field of Search ................................. 340/945, 984, 340/973, 974, 975, 976

(56) References Cited

U.S. PATENT DOCUMENTS

| | | | |
|---|---|---|---|
| 3,701,279 A | | 10/1972 | Harris et al. |
| 3,746,844 A | | 7/1973 | Azum et al. |
| 4,831,538 A | | 5/1989 | Cucchiari et al. |
| 4,980,833 A | | 12/1990 | Milligan et al. |
| 5,202,690 A | | 4/1993 | Frederick ..................... 342/26 |
| 5,331,330 A | | 7/1994 | Susnjara ..................... 342/460 |
| 5,521,827 A | | 5/1996 | Lindberg et al. |
| 5,548,517 A | | 8/1996 | Nance |
| 5,758,297 A | * | 5/1998 | Gaultier ........................ 701/14 |
| 6,057,786 A | * | 5/2000 | Briffe et al. ................. 340/975 |
| 6,085,129 A | * | 7/2000 | Schardt et al. ................. 701/14 |
| 6,094,608 A | | 7/2000 | Bomans et al. |
| 6,128,951 A | | 10/2000 | Nance |
| 6,317,659 B1 | | 11/2001 | Lindsley et al. |
| 6,392,661 B1 | * | 5/2002 | Tankersley .................... 345/660 |
| 6,512,527 B1 | * | 1/2003 | Barber et al. ................ 345/764 |
| 6,639,522 B2 | * | 10/2003 | Derderian .................... 340/945 |
| 6,690,298 B1 | * | 2/2004 | Barber et al. ................ 340/971 |
| 6,696,980 B1 | * | 2/2004 | Langner et al. ............. 340/971 |

FOREIGN PATENT DOCUMENTS

| | | |
|---|---|---|
| EP | 0 381 164 A2 | 8/1990 |
| EP | 0 381 164 A3 | 8/1990 |
| EP | 0 802 469 A1 | 10/1997 |
| GB | 1 226 214 | 3/1971 |
| WO | WO 85/01372 | 3/1985 |
| WO | WO 93/16359 | 8/1993 |

OTHER PUBLICATIONS

Payne, B., "Aircraft Weighing", *Measurement + Control*, vol. 24, May 1991 (pp. 102–104).

"Do–it–yourself weighing machine approved", *Flight International* (p. 30), Jul. 7, 1998.

EPO, "International Search Report," for International application No. PCT/US 01/43001, Aug. 20, 2002.

Federal Aviation Regulations/Aeronautical Information Manual (FAR/AIM), U.S. Department of Transportation (2002).

* cited by examiner

*Primary Examiner*—John Tweel, Jr.
(74) *Attorney, Agent, or Firm*—Finnegan, Henderson, Farabow, Garrett & Dunner, L.L.P.

(57) ABSTRACT

Methods and apparatus are provided for airspace navigation. Airspace navigation information for an aircraft is displayed in a first mode, such as, in a horizontal mode. One or more navigation events may then be detected, such as, proximity to a terrain feature, weather, traffic etc. The airspace navigation information for the aircraft is then displayed using dual modes, e.g., a horizontal mode and a vertical mode. Display parameters, such as colors, resolution, distance, scale, etc. may be set automatically or by a user. The display may also include information, such as avionics systems information, and communications information.

16 Claims, 19 Drawing Sheets

US 6,930,617 B2

METHODS AND APPARATUS FOR AIRSPACE NAVIGATION

REFERENCE TO RELATED APPLICATIONS

This application claims the benefit of priority from prior provisional application Ser. No. 60/246,607, filed Nov. 8, 2000, now abandoned, for "METHODS AND APPARATUS FOR AIRSPACE NAVIGATION," which is incorporated herein by reference.

FIELD OF THE INVENTION

This invention relates generally to airspace navigation. More particularly, it relates to methods and apparatus for providing airspace navigation including both horizontal and vertical airspace navigation.

BACKGROUND OF THE INVENTION

Navigation of an aircraft in a particular airspace requires control in a horizontal component and in a vertical component. Today, conventional moving map displays assist a pilot in navigating airspace by displaying an overhead perspective of an aircraft and surrounding terrain. For example, FIG. 19 shows a conventional moving map display 208 with an aircraft icon 210 traveling between a restricted airspace 218; terrain features 214, 216, and 220; and approaching traffic 212. As can be seen in FIG. 19, conventional moving map displays do not show the vertical component of airspace navigation in a manner useful for the pilot.

Since conventional moving map displays do not show this vertical component data, the pilot generally must refer elsewhere to resolve any vertical navigation concerns, e.g., altitude restrictions of restricted airspace 218 or the altitude of terrain features 214, 216, 220 or the altitude of traffic 212. Accordingly, a pilot must typically refer to a conventional paper sectional chart to determine the airspace type and its parameters when approaching restricted airspace or hazardous terrain. Also, a pilot may need to know which altitude to climb to or to descend in order to avoid traffic.

It is accordingly desirable to provide pilots with integrated horizontal and vertical navigation information. This is achieved by providing a dual mode airspace navigation system that displays horizontal and vertical navigation information to the pilot.

SUMMARY OF THE INVENTION

In accordance with one embodiment consistent with the present invention, a method for providing airspace navigation information comprises: displaying airspace navigation information for an aircraft on a display in a first mode; detecting a navigation event; and automatically displaying airspace navigation information for the aircraft on the display in the first mode and at least one additional mode, in response to the navigation event.

In accordance with another embodiment consistent with the present invention, an airspace navigation system comprises: a navigation data module to receive navigation data; a controller to detect a navigation event based on the navigation data; and a display to provide the navigation data in a horizontal mode and a vertical mode, in response to the navigation event.

In accordance with another embodiment consistent with the present invention, an apparatus for providing airspace navigation information comprises: means for displaying airspace navigation information for an aircraft on a display in a first mode; means for detecting a navigation event; and means for automatically displaying airspace navigation information for the aircraft on the display in the first mode and at least one additional mode, in response to the navigation event.

In accordance with yet another embodiment consistent with the present invention, a computer readable medium capable of configuring a processor to perform a method for providing airspace navigation information, the method comprises: displaying airspace navigation information for an aircraft on a display in a first mode; detecting a navigation event; and automatically displaying airspace navigation information for the aircraft on the display in the first mode and at least one additional mode, in response to the navigation event.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
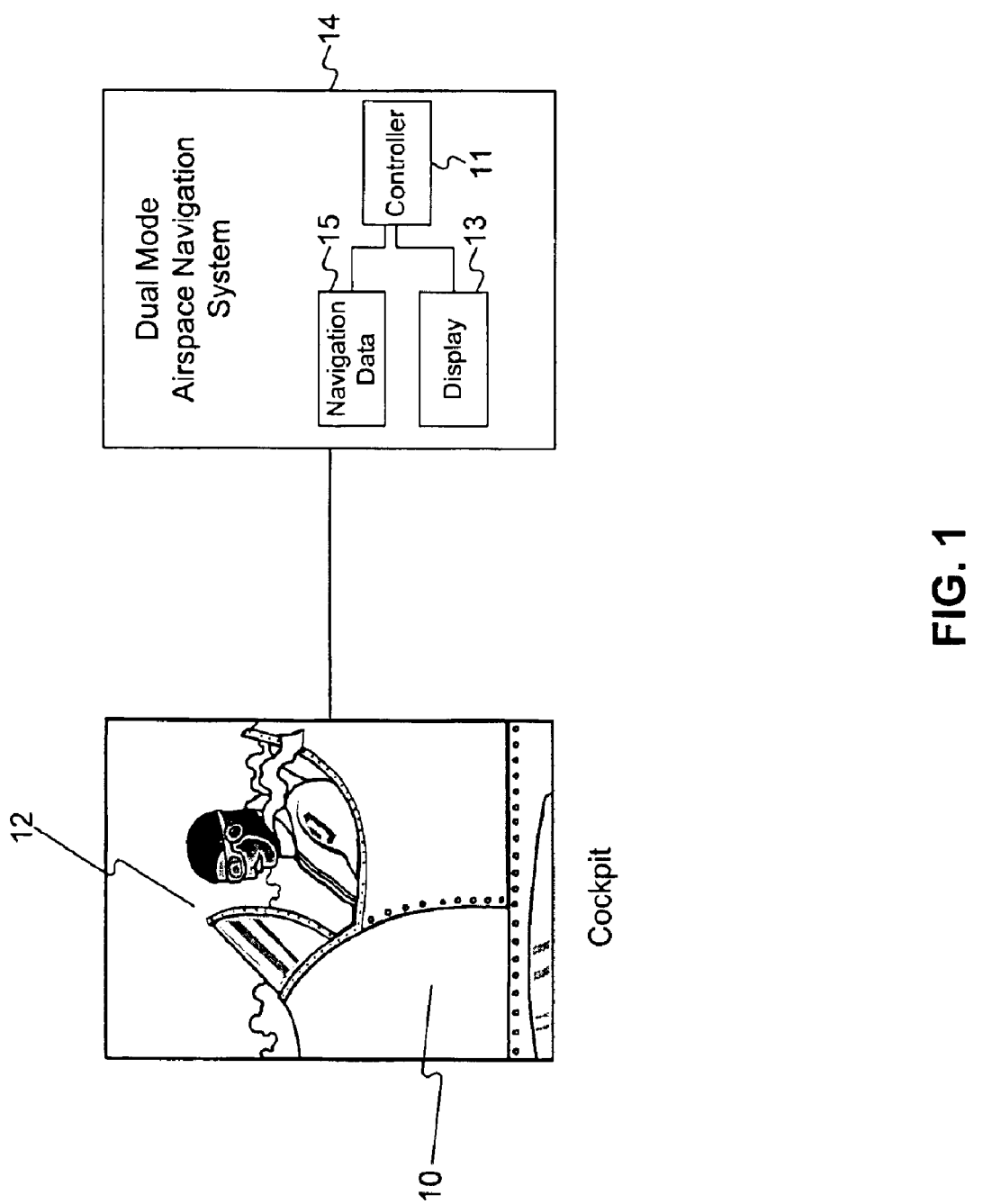
FIG. 1 shows a pilot in an aircraft with an exemplary dual mode airspace navigation system, in accordance with the principles of the present invention.

FIG. 1 shows a pilot in an aircraft with an exemplary dual mode airspace navigation system. In particular, an aircraft 10 is shown operated by a pilot 12 using a dual mode airspace navigation system 14. Dual mode airspace navigation system 14 is comprised of a display 13, a controller 11, and a navigation data module 15.

Display 13 is a multi-function display which provides airspace navigation information to pilot 12. Display 13 may also act as an interface device to allow pilot 12 to input data, e.g., by directly touching the screen. Multi-function displays such as CRT and LCD display devices are known by those of ordinary skill in the art. However, any display which allows a pilot to easily interpret visual information may be used in the present invention.

Controller 11 controls operation of the dual mode airspace navigation system 14. Controller 11 drives display 13 and interfaces with navigation data module 15. In addition, controller 11 controls interface to the other aircraft systems (not shown), e.g., avionics, and communication systems. In one embodiment, controller 11 comprises a computer such as a Pentium™ processor. However, any combination of hardware and software for controller 11 may be used in the present invention.

Navigation data module 15 stores and maintains navigation data for aircraft 10. For example, navigation data may include aircraft position data, terrain and airspace position data, weather data, speed, and traffic information. However, any type of navigation data which aids in flight operations and flight safety is within the principles of the present invention.

Navigation data module 15 may receive input from several sources in order to provide an informative display. For example, navigation signals which use global positioning system (GPS) signals are known by those of ordinary skill in the art. Weather data for noting storm locations and wind data may be input as known by those of ordinary skill in the art. Navigation data module 15 may also receive input from the avionics systems (not shown) and communications systems (not shown) of aircraft 10.

Navigation data module 15 preferably uses navigation data stored on a computer-readable medium, e.g., compact disc or downloaded via a computer network, e.g., the Internet. However, any source of navigation data which aids in flight operation and flight safety is within the principles of the present invention.

Figure 2:
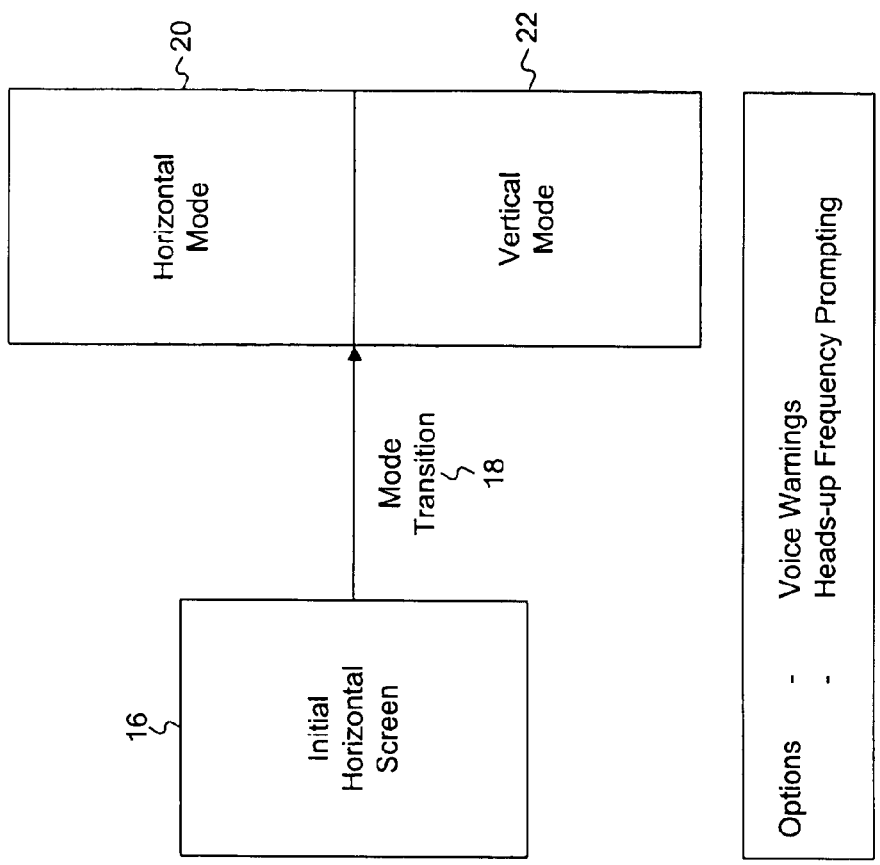
FIG. 2 shows a general hierarchy of displays used by the system of FIG. 1.

FIG. 2 shows a general hierarchy of displays of the dual mode airspace navigation system shown in FIG. 1. In particular, an initial horizontal screen 16 is displayed to pilot 12. When triggered by a mode transition signal 18, dual mode airspace navigation system 14 displays a horizontal mode 20 and a vertical mode 22.

Display parameters, such as colors, resolution, distance scale, etc., may be set to default values or set by pilot 12. In one embodiment, display parameters are set to default values by the system manufacturer. However, any set of display parameters which allow for an informative and clear navigation display are within the principles of the present invention.

Initial horizontal screen 16 displays a conventional moving map display using an overhead perspective. In one embodiment, initial horizontal screen 16 is displayed during normal flight operations where pilot 12 is primarily concerned with the horizontal position of plane 10.

Mode transition signal 18 may be triggered according to a wide variety of conditions and scenarios, in accordance with the principles of the present invention. Mode transition signal 18 may be automatically triggered, e.g., when aircraft 10 is in close proximity to a terrain feature or restricted airspace that is, when the aircraft position, as determined, for example, by GPS sensors, is within a predetermined distance of the position of terrain feature or restricted airspace, as stored in a database of navigation data module 15. Conditions and scenarios which cause an automatic mode transition may be set by the manufacturer and/or defined by pilot 12.

For example, 6 miles or 10 minutes may be used as a default value for close proximity to restricted airspace or terrain feature. Mode transition signal 18 may also depend upon various flight parameters such as heading, speed, and altitude. The principles of the present invention may use any of a wide variety of mode transitions conditions.

Mode transition signal 18 may also be manually triggered, e.g., by pilot 12 pressing a selector button on display 13. However, any scenario in which dual mode navigation displays would aid in flight operations and flight safety is in accordance with the principles of the present invention.

Mode transition signal 18 may also be accompanied with indication aids. Various indication aids are known by those of ordinary skill in the art. For example, mode transition signal 18 may be accompanied by an audible voice warning or a head-up display prompting. Indication aids may be set to a default type or set by pilot 12. However, any indication aid which allows pilot 12 to easily note when mode transition signal 18 occurs is within the principles of the present invention.

Figure 3:
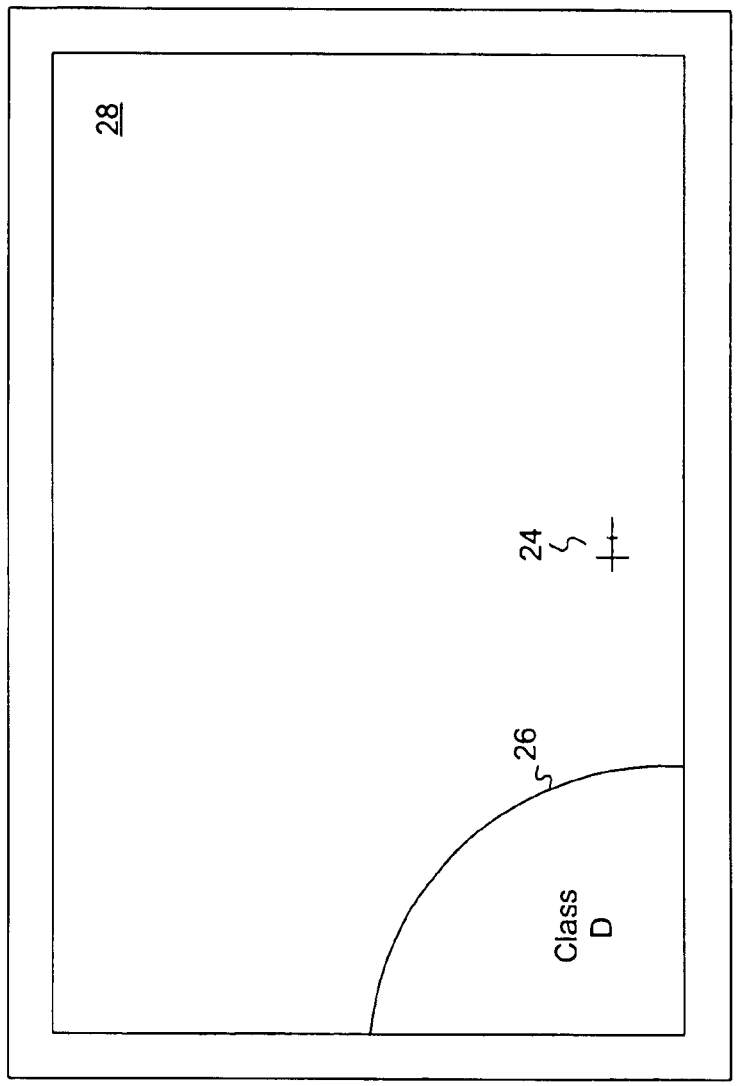
FIG. 3 shows an initial horizontal display as an aircraft approaches class D airspace.

FIG. 3 shows an initial horizontal display as aircraft 10 approaches restricted airspace, i.e., class D airspace. As known by those of ordinary skill in the art, class B, class C, and class D restricted airspaces are defined in the Federal Aviation Administration publication, "Airman's Information Manual ". The definition of class D airspace is typically restricted airspace associated with small towered airports and generally extends up to 2,000 to 2,500 feet. In particular, initial horizontal display 28 shows an aircraft icon 24 approaching class D restricted airspace 26.

Figure 4:
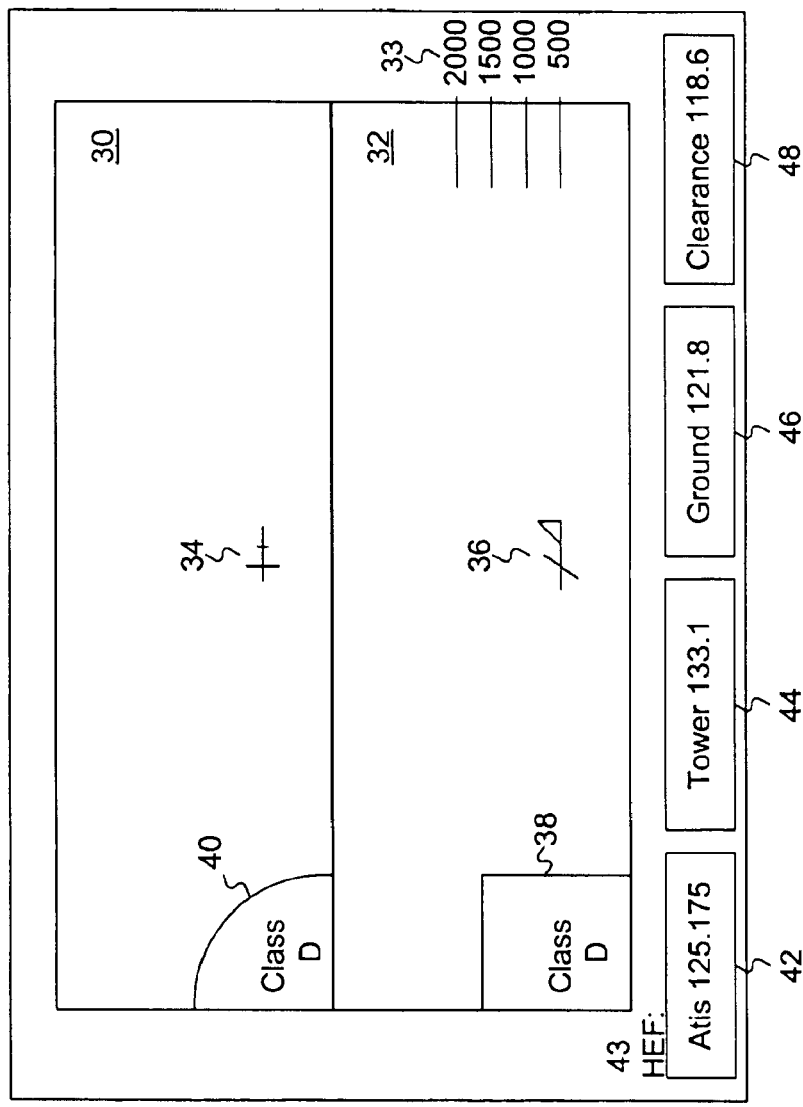
FIG. 4 shows a dual mode horizontal and vertical display as an aircraft approaches the class D airspace shown in FIG. 3.

FIG. 4 shows a dual mode horizontal and vertical display generated as an aircraft approaches the class D airspace shown in FIG. 3. In particular, as noted above, dual mode display 31 is presented in response to aircraft 10 coming in close proximity to restricted airspace 26. Dual mode display 31 shows a horizontal mode 30 and vertical mode 32.

Horizontal mode 30 shows an aircraft icon 34 and horizontal component 40 of restricted airspace 26. Vertical mode 32 shows an aircraft icon 36, an altitude scale 33, and vertical component 38 of restricted airspace 26. As can be seen in FIG. 4, aircraft 10 is currently horizontally clear of restricted airspace 26 and at an altitude of approximately 750 feet. For example, if pilot 12 wished to fly above restricted airspace 26, then vertical mode 32 easily shows that the pilot must climb to an altitude of at least 2,000 feet.

Dual mode display 31 also shows an airport code 43, e.g. "HEF" for the Manassas, Va. airport, air traffic information system (ATIS) radio frequency 42, tower frequency 44, ground frequency 46, and clearance frequency 48. The purpose and use of these frequencies is known by those of ordinary skill in the art. The pilot 12 may automatically initiate communications on one of these frequencies by selecting the desired frequency on the display by, for example, highlighting and clicking or pressing the approximate area, if display 13 is a touch sensitive screen.

Other information such as distance from the airport, fuel, speed, etc. may also be displayed by default setting or according to pilot configuration. In one embodiment, airport code, ATIS frequency, tower frequency, ground frequency, and clearance frequency are provided. However, any information which may aid in navigation is within the principles of the present invention.

Airport code 43, ATIS frequency 42, tower frequency 44, ground frequency 46 and clearance frequency 48 may be always shown on all displays or selectively shown at certain times, e.g., when approaching an airport. In one embodiment, this information is shown at all times. However, the display of this information at any time when this information is considered appropriate or needed is within the principles of the present invention.

Figure 5:
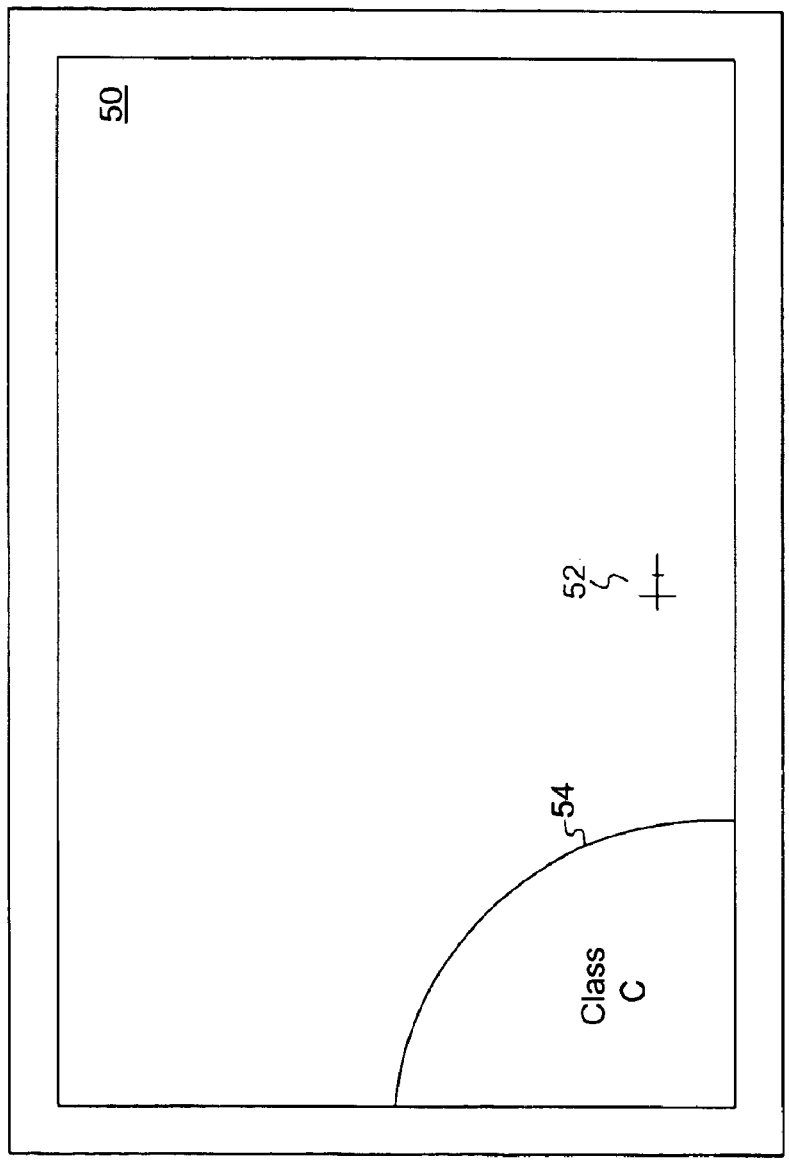
FIG. 5 shows an initial horizontal display as an aircraft approaches class C airspace.

FIG. 5 shows an initial horizontal display as an aircraft approaches class C airspace. In particular, initial horizontal display 50 shows aircraft icon 52 and class C restricted airspace 54. Class C restricted is typically restricted airspace associated with medium towered airports has a general "mushroom" profile, which is not seen in horizontal mode.

Figure 6:
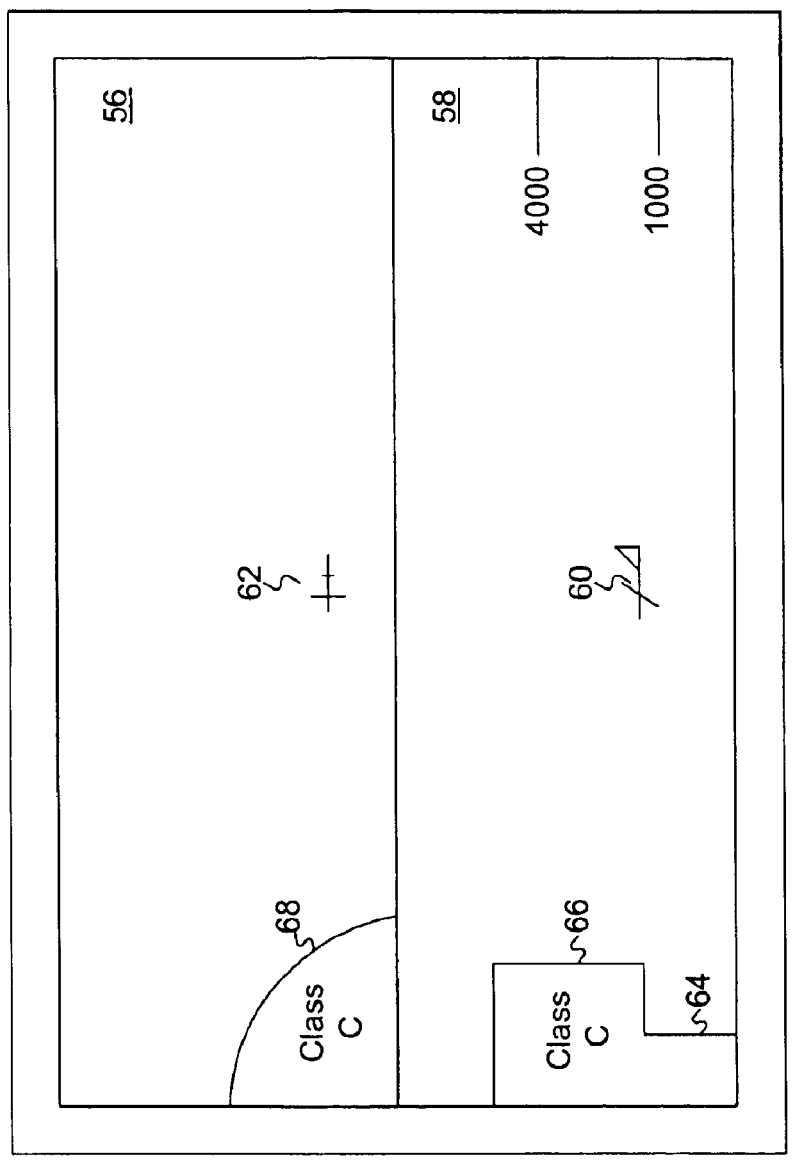
FIG. 6 shows a dual mode horizontal and vertical display as an aircraft approaches the class C airspace shown in FIG. 5.

FIG. 6 shows a dual mode horizontal and vertical display as an aircraft approaches the class C airspace shown in FIG. 5. In particular, horizontal mode 56 shows aircraft icon 62 approaching the horizontal component 68 of restricted airspace 54. Vertical mode 58 shows aircraft icon 60 at 1,000 feet and vertical components 64 and 66 of restricted airspace 54 to form a general "mushroom" profile. As can be seen in FIG. 6, restricted airspace 54 can be cleared at an altitude above 4,000 feet. Therefore, pilot 12 can adjust altitude or heading to respectively overfly or avoid the restricted airspace.

Figure 7:
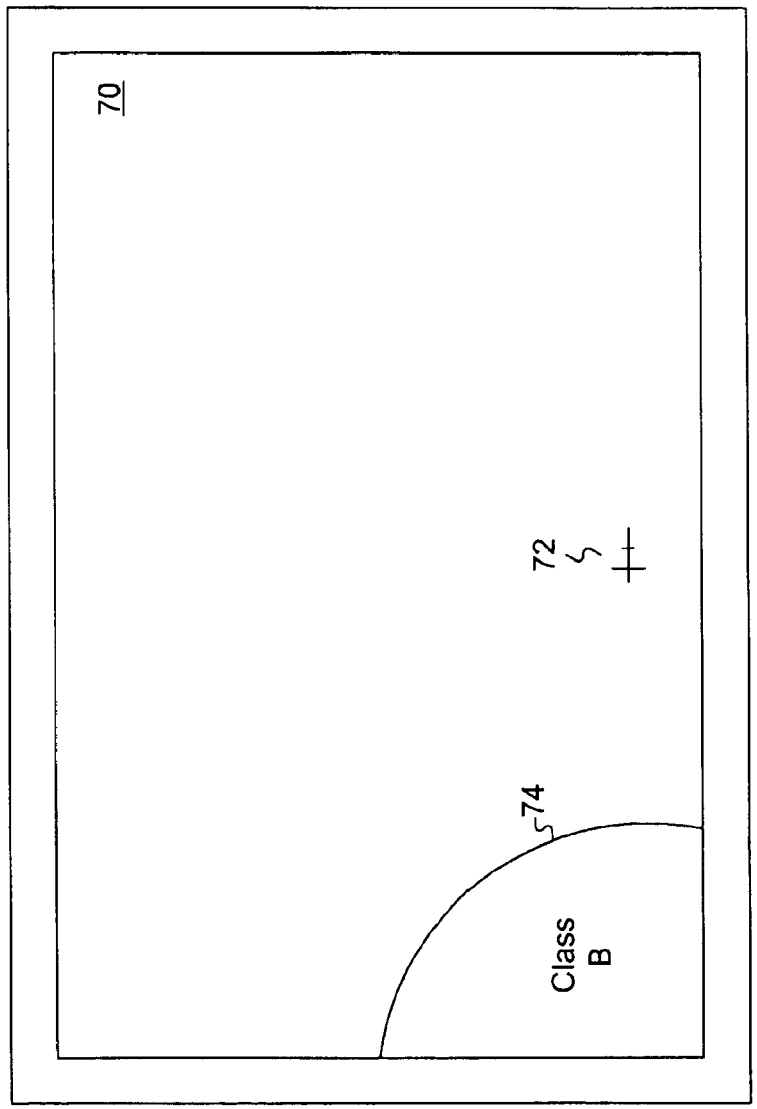
FIG. 7 shows an initial horizontal display as an aircraft approaches class B airspace.

FIG. 7 shows an initial horizontal display as an aircraft approaches class B airspace. In particular, initial horizontal display 70 shows aircraft icon 72 and class B restricted airspace 74. Class B restricted airspace is typically restricted airspace associated with large towered airports and has a general inverted "wedding cake " profile, which is not seen in horizontal mode.

Figure 8:
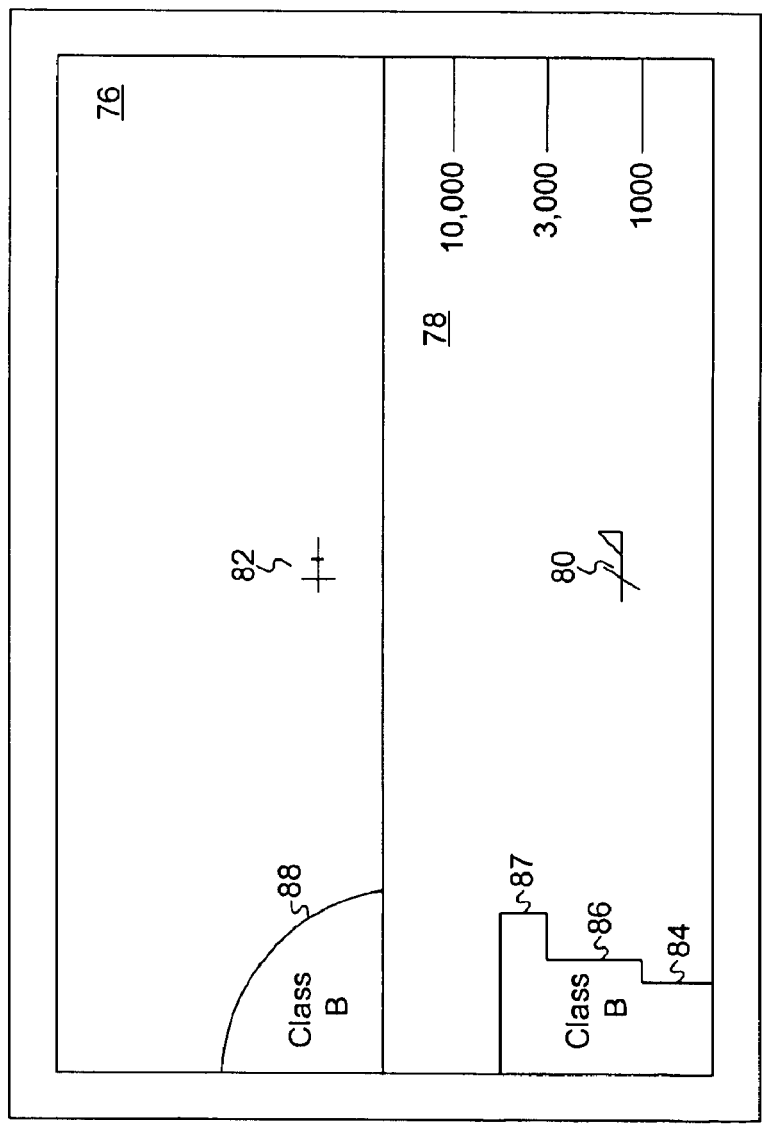
FIG. 8 shows a dual mode horizontal and vertical display as an aircraft approaches the class B airspace shown in FIG. 7.

FIG. 8 shows a dual mode horizontal and vertical display as an aircraft approaches the class B airspace shown in FIG. 7. In particular, horizontal mode 76 shows aircraft icon 82 approaching the horizontal component 88 of restricted airspace 74. Vertical mode 78 shows aircraft icon 80 at approximately 1,200 feet and vertical components 84, 86 and 87 of restricted airspace 74 to form the "wedding cake" profile. As can be seen in FIG. 8, restricted airspace 74 can be cleared at an altitude above 10,000 feet. Therefore, pilot 12 can adjust altitude or heading to respectively overfly or avoid the restricted airspace.

Figure 9:
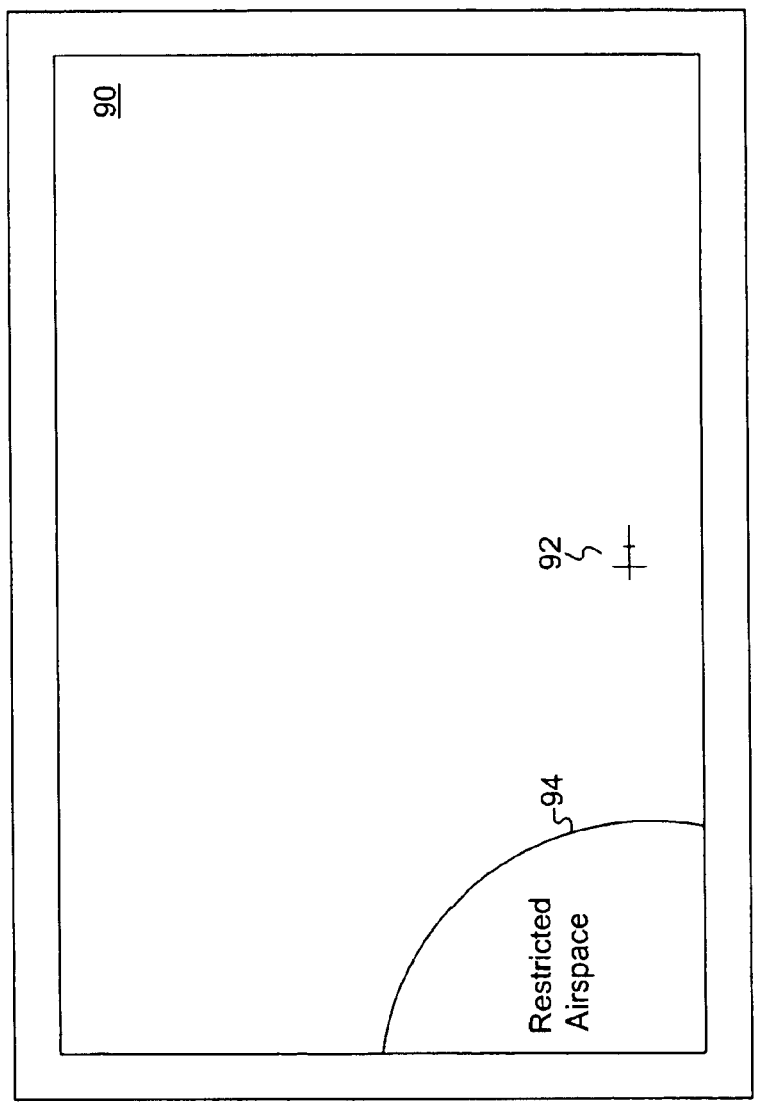
FIG. 9 shows an initial horizontal display as an aircraft approaches restricted airspace.

FIG. 9 shows an initial horizontal display as an aircraft approaches restricted airspace (e.g., of a type other than class D airspace). In particular, initial horizontal display 90 shows aircraft icon 92 and restricted airspace 94.

Figure 10:
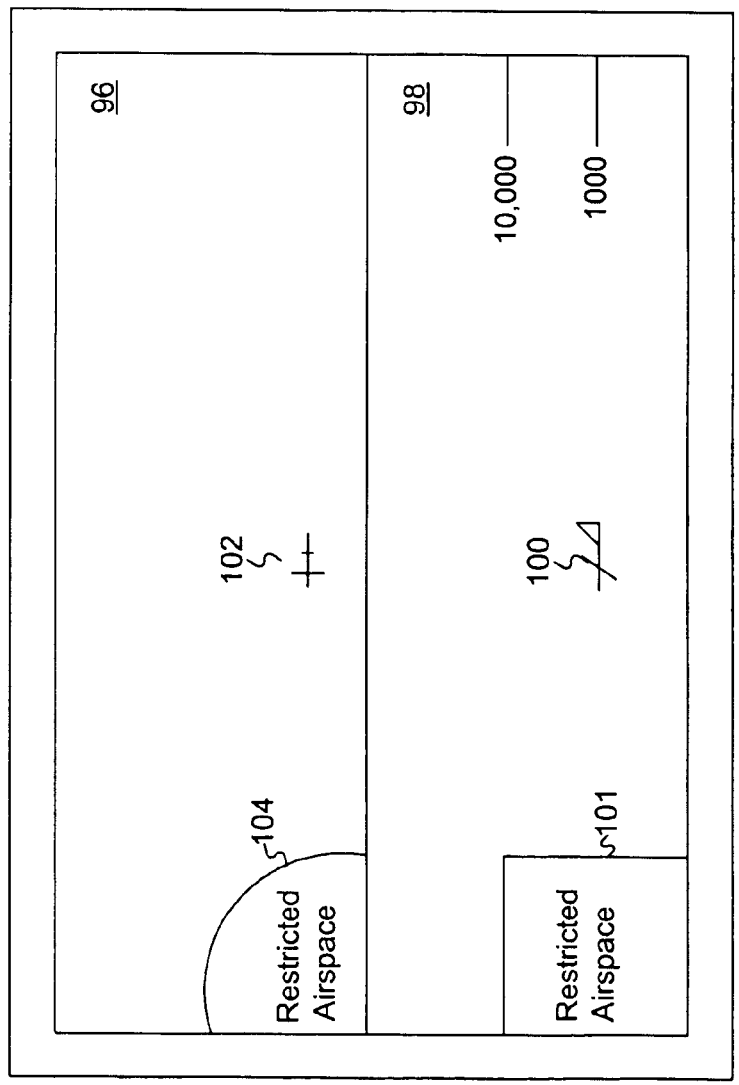
FIG. 10 shows a dual mode horizontal and vertical display as an aircraft approaches the restricted airspace shown in FIG. 10.

FIG. 10 shows a dual mode horizontal and vertical display as an aircraft approaches the restricted airspace shown in FIG. 9. In particular, horizontal mode 96 shows aircraft icon 102 clear of the horizontal component 104 of restricted airspace 94. Vertical mode 98 shows aircraft icon 100 at approximately 1,000 feet and vertical component 101 of restricted airspace 104. As can be seen in FIG. 10, restricted airspace 94 can be cleared at an altitude above 10,000 feet. Therefore, pilot 12 can adjust altitude accordingly to avoid and/or clear the restricted airspace.

Figure 11:
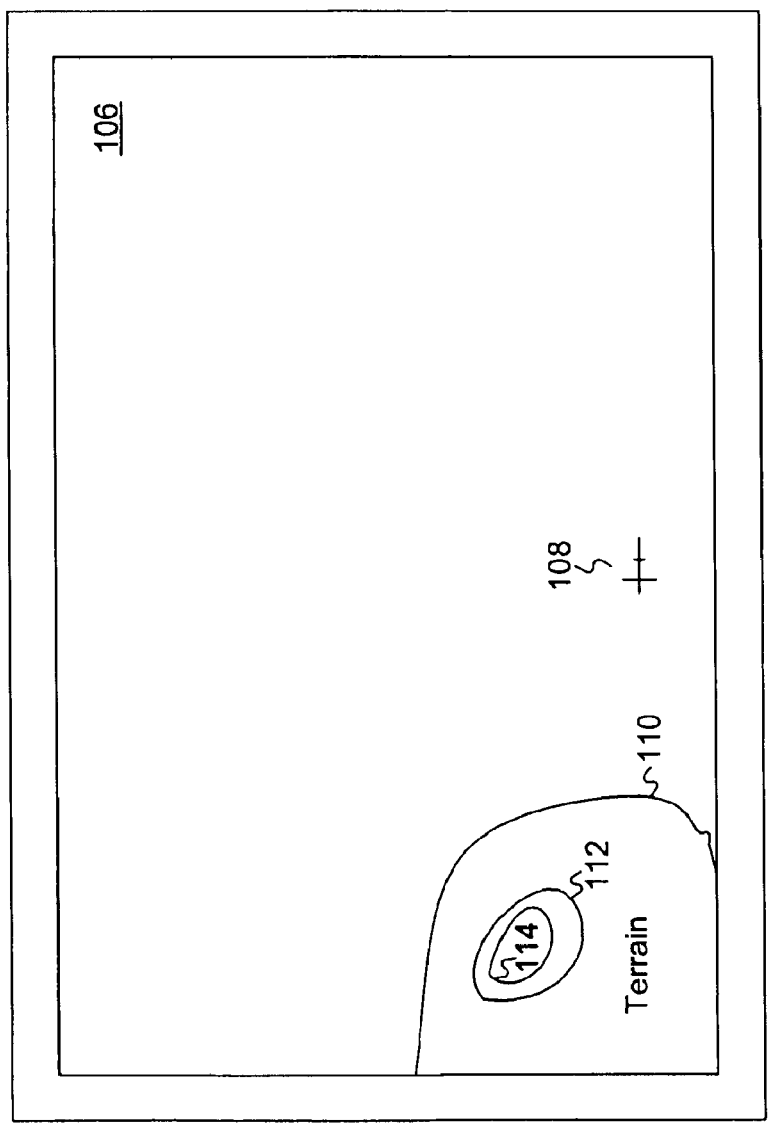
FIG. 11 shows an initial horizontal display as an aircraft approaches hazardous terrain.

FIG. 11 shows an initial horizontal display as an aircraft approaches terrain. In particular, initial horizontal display 106 shows aircraft icon 108 and terrain features 110, 112, and 114.

Figure 12:
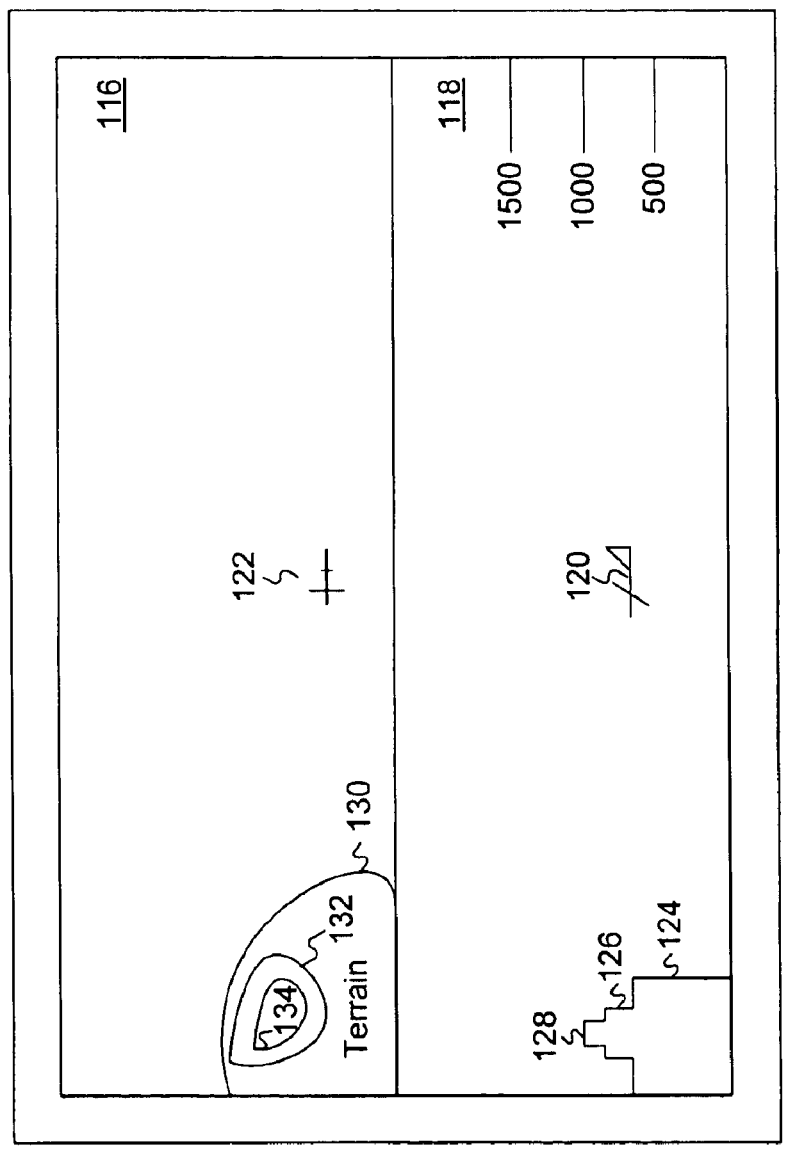
FIG. 12 shows a dual mode horizontal and vertical display as an aircraft approaches the terrain shown in FIG. 11.

FIG. 12 shows a dual mode horizontal and vertical display as an aircraft approaches the terrain shown in FIG. 11. In particular, horizontal mode 116 shows aircraft icon 122 approaching the horizontal terrain features 130, 132, and 134. Of note, vertical mode 118 shows aircraft icon 120 at approximately 500 feet and vertical components 124, 126, and 128 as terrain features. As can be seen in FIG. 12, the terrain features can be cleared at an altitude above 1,500 feet. Therefore, pilot 12 can adjust altitude or heading to respectively overfly or avoid the terrain.

Figure 13:
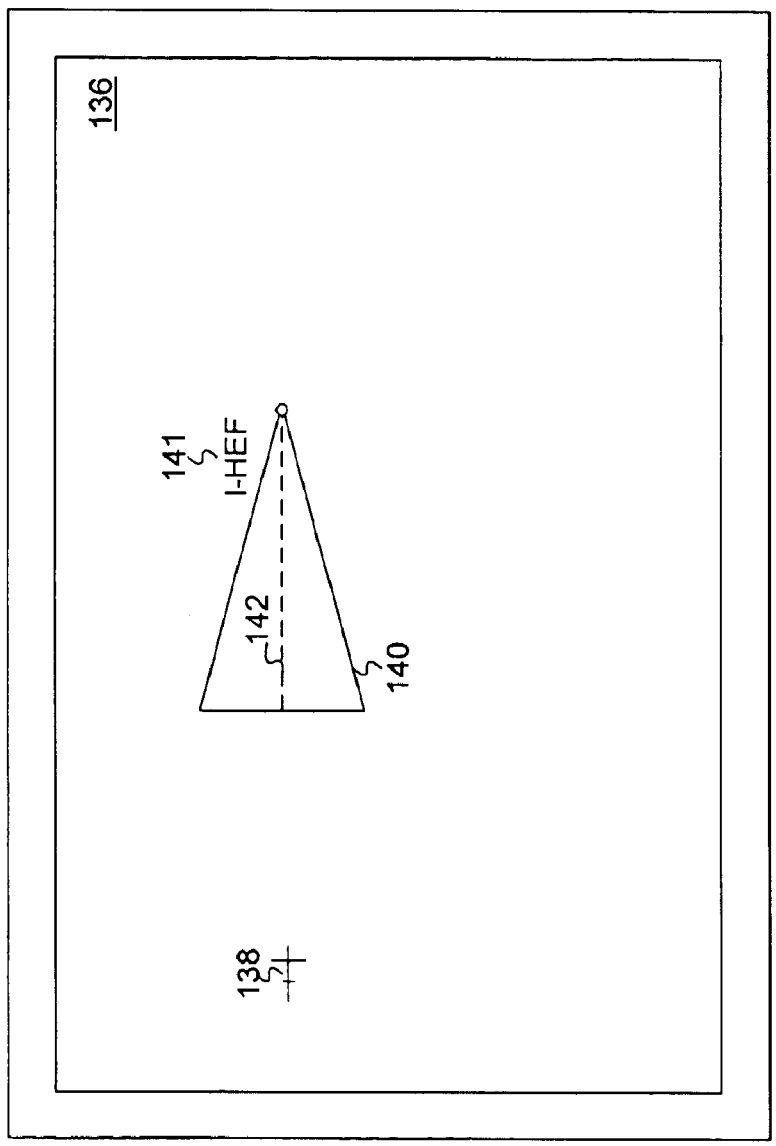
FIG. 13 shows an initial horizontal display for an instrument landing system (ILS) mode landing for an airport.

FIG. 13 shows an initial horizontal display for an instrument landing system (ILS) approach for landing. In particular, initial horizontal display 136 shows aircraft icon 138, ILS identification 141, e.g., for the ILS at HEF which is the Manassas, Va. airport, and localizer pattern 140 which indicates the allowable horizontal deviation from center beam 142.

Figure 14:
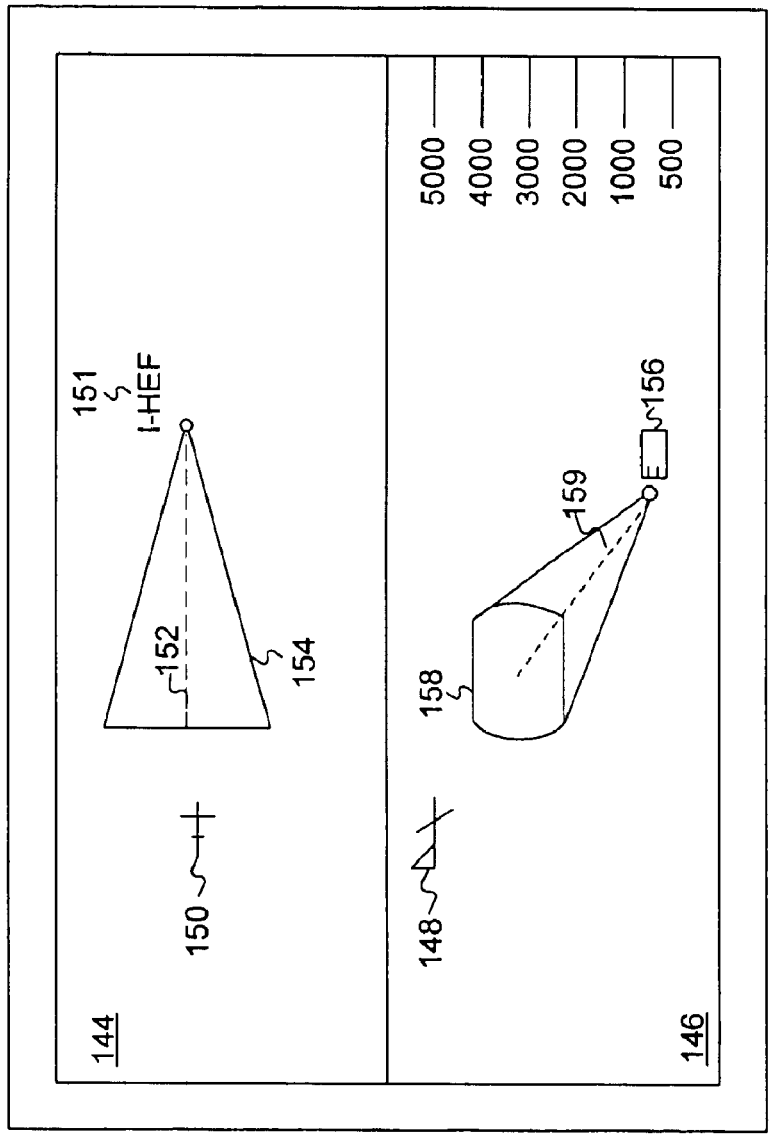
FIG. 14 shows a dual mode horizontal and vertical display for an ILS mode landing for the airport shown in FIG. 13.

FIG. 14 shows a dual mode horizontal and vertical display for the ILS mode landing shown in FIG. 13. In particular, horizontal mode 144 shows aircraft icon 150, ILS identification code 151, e.g., I-HEF, and localizer pattern 154 which indicates the allowable horizontal deviation from localizer center beam 152. Vertical mode 146 shows aircraft icon 148 at approximately 5,000 feet, glide slope information 158 which indicates the allowable altitude deviation from the glide slope center beam 159 to runway icon 156. As can be seen in FIG. 14, pilot 12 should enter beam 158 to follow the ILS for a proper landing.

Figure 15:
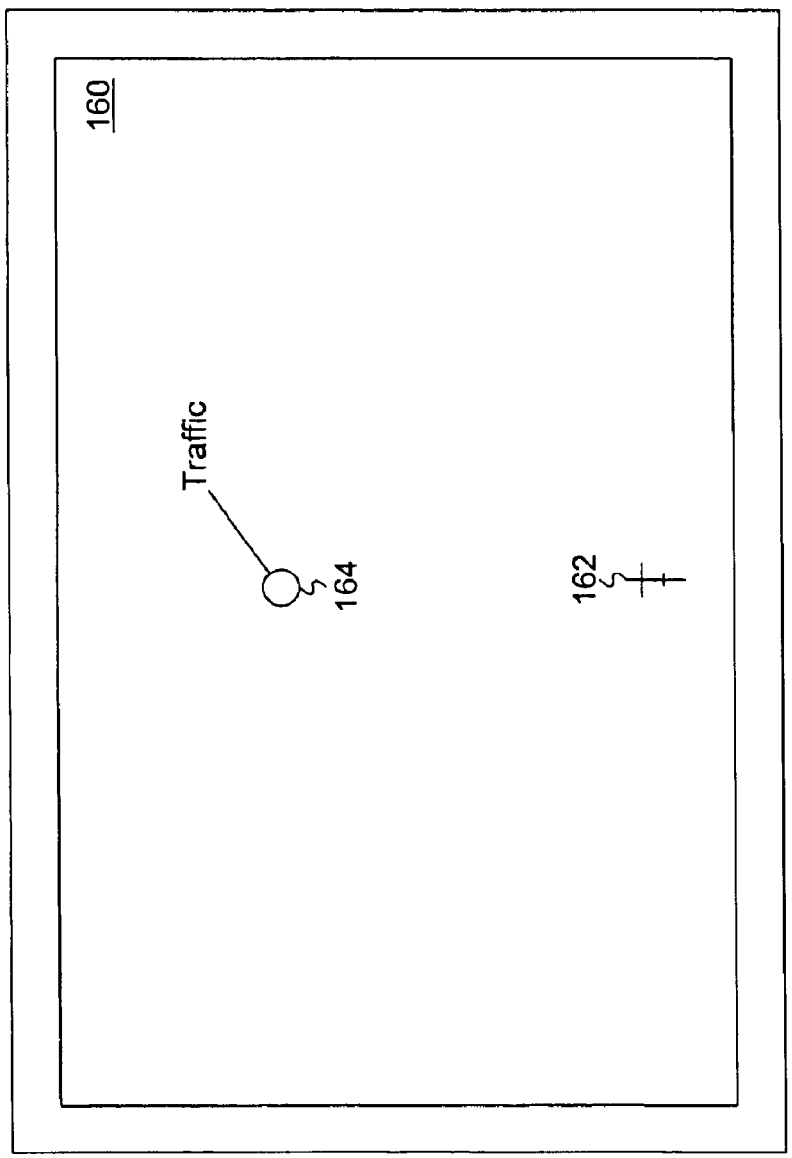
FIG. 15 shows an initial horizontal display as an aircraft approaches traffic.

FIG. 15 shows an initial horizontal display as an aircraft approaches traffic. In particular, initial horizontal display 160 shows aircraft icon 162 and approaching traffic 164.

Figure 16:
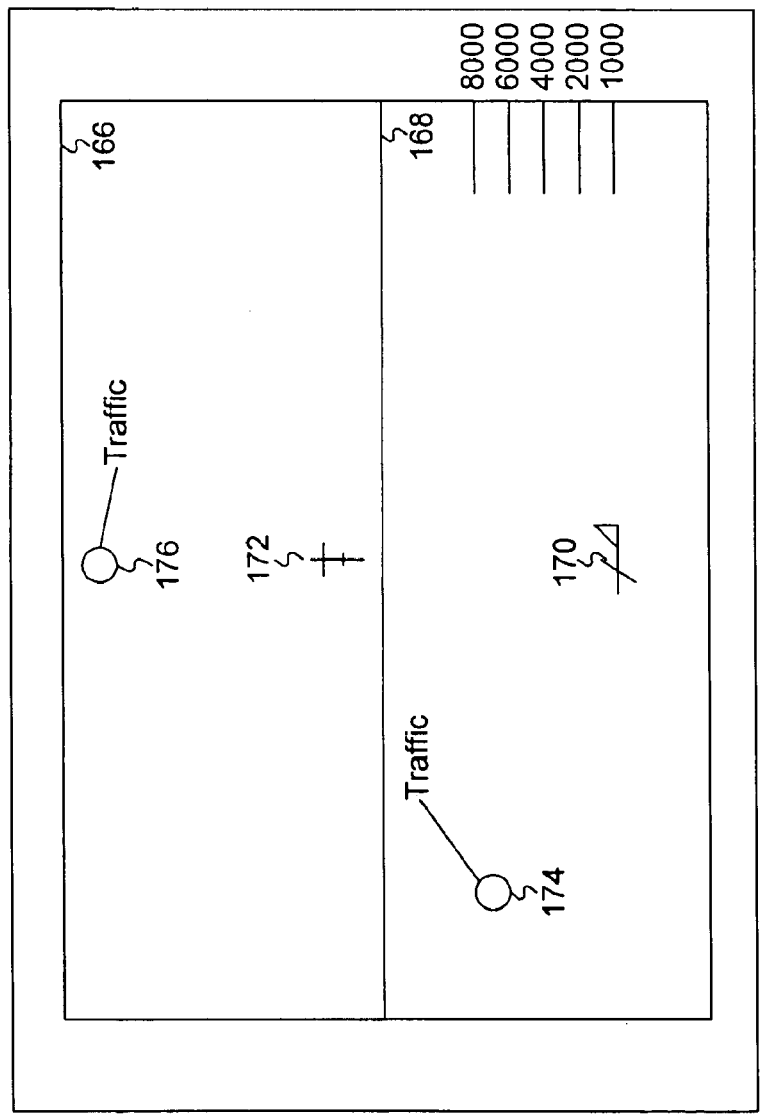
FIG. 16 shows a dual mode horizontal and vertical display as an aircraft approaches the traffic shown in FIG. 15.

FIG. 16 shows a dual mode horizontal and vertical display as an aircraft approaches the traffic shown in FIG. 15. In particular, horizontal mode 166 shows aircraft icon 172 clear of traffic 176. Of note, vertical mode 168 shows aircraft icon 170 at approximately 1,000 feet and traffic 176 at approximately 7,000 feet. As can be seen in FIG. 16, traffic 176 can be cleared by avoiding any altitude between 4,000 and 6,000 feet. Therefore, pilot 12 can adjust altitude accordingly to avoid and/or climb or descend to clear the traffic.

Figure 17:
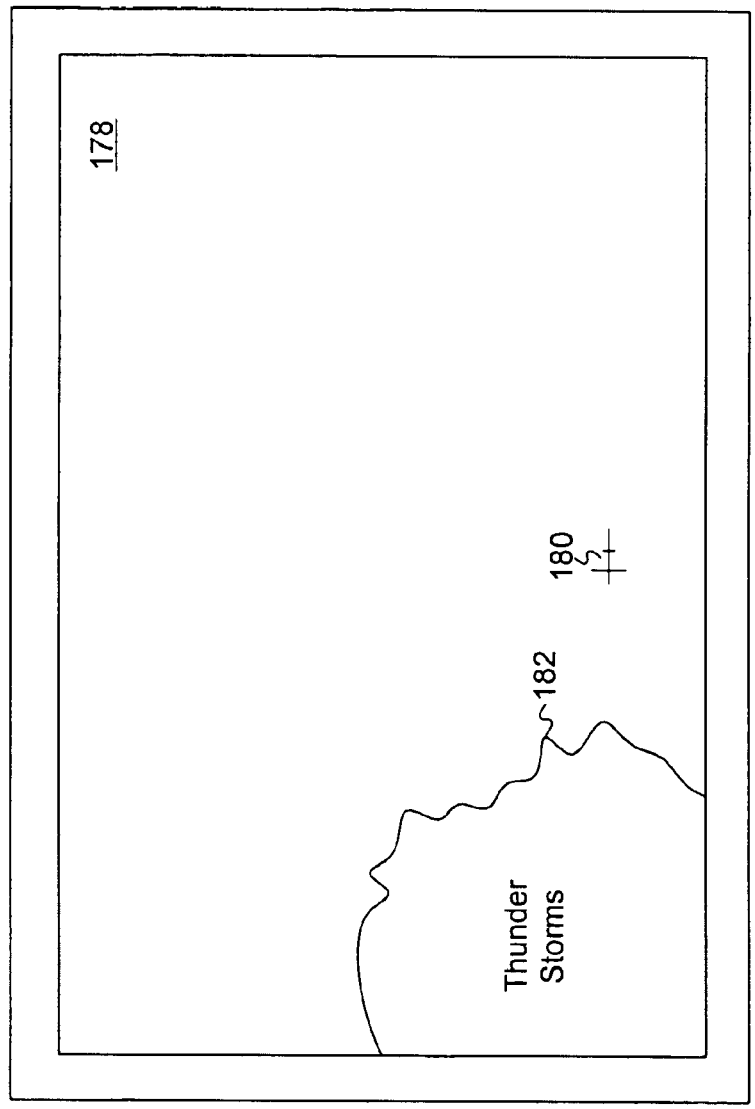
FIG. 17 shows an initial horizontal display as an aircraft approaches a thunderstorm.

FIG. 17 shows an initial horizontal display as an aircraft approaches a thunderstorm. In particular, initial horizontal display 178 shows aircraft icon 180 approaching a weather feature 182, e.g., a thunderstorm.

Figure 18:
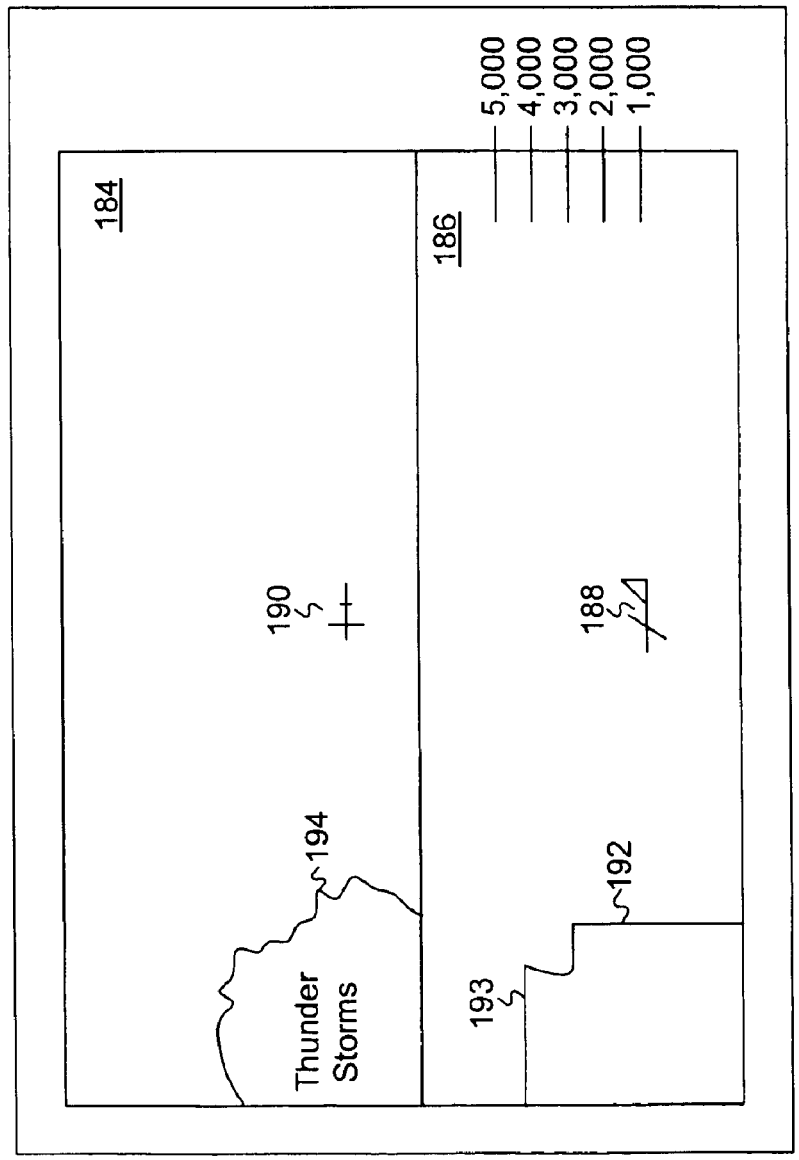
FIG. 18 shows a dual mode horizontal and vertical display as an aircraft approaches the thunderstorm shown in FIG. 17.
Figure 19:
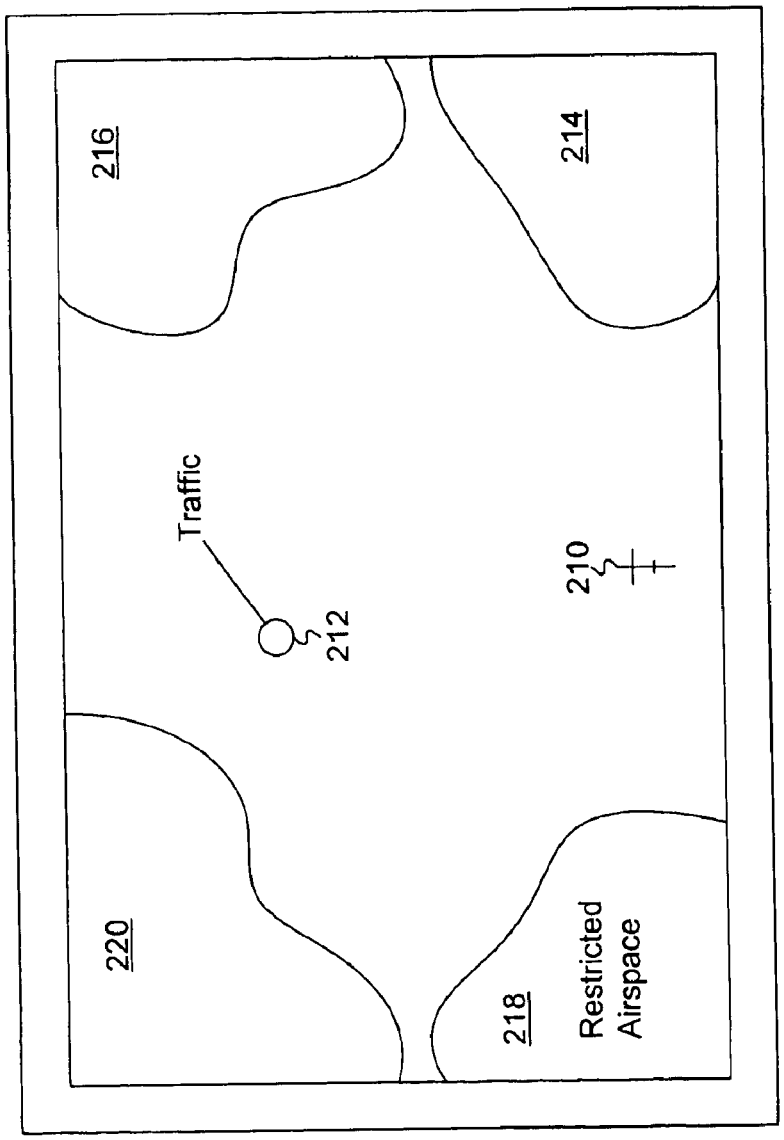
FIG. 19 shows a typical horizontal-only display of a conventional moving map display.

FIG. 18 shows a dual mode horizontal and vertical display as an aircraft approaches the thunder storm shown in FIG. 17. In particular, horizontal mode 184 shows aircraft icon 190 clear of the weather feature 194. Vertical mode 186 shows aircraft icon 188 at approximately 1,000 feet and vertical components 192 and 193 of weather feature 182. As can be seen in FIG. 18, weather feature 182 can only be cleared at an altitude of 5,000 feet. Therefore, pilot 12 can adjust altitude accordingly to avoid and/or clear the weather or, more appropriately (in this case) can avoid weather feature 182 because of the excessive height.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing airspace navigation information, comprising:

displaying airspace navigation information for an aircraft on a display in a first mode;

detecting a navigation event; and automatically displaying airspace navigation information for the aircraft on the display in the first mode and at least one additional mode, in response to the navigation event.

2. The method of claim 1, wherein detecting a navigation event comprises:

detecting a proximity of the aircraft to a navigation feature.

3. The method of claim 2, wherein detecting a proximity of the aircraft to the navigation feature comprises detecting a proximity to a terrain feature.

4. The method of claim 2, wherein detecting a proximity of the aircraft to the navigation feature comprises detecting a proximity to an area of restricted airspace.

5. The method of claim 2, wherein detecting a navigation event comprises receiving a mode transition signal based on the proximity of the aircraft to the navigation feature.

6. The method of claim 1, wherein detecting a navigation event comprises receiving a mode transition signal based upon a flight parameter of the aircraft.

7. The method of claim 1, wherein detecting a navigation event comprises receiving a mode transition signal in response to a user input.

8. The method of claim 1, wherein detecting a navigation event comprises detecting a proximity to a weather event.

9. The method of claim 1, wherein detecting a navigation event comprises detecting a proximity to at least one additional aircraft.

10. The method of claim 1, wherein displaying airspace navigation information for an aircraft on the display in the first mode comprises displaying airspace navigation information from an overhead perspective.

11. The method of claim 1, wherein automatically displaying airspace navigation for the aircraft on the display in the first mode and at least one additional mode comprises displaying information for a vertical component of airspace navigation.

12. The method of claim 1, further comprising:

providing at least one indication aid in response to the navigation event.

13. The method of claim 12, wherein providing at least one indication aid comprises providing an audible indication aid.

14. The method of claim 12, wherein providing at least one indication aid comprises providing a visual indication aid.

15. An apparatus for providing airspace navigation information, comprising:

means for displaying airspace navigation information for an aircraft on a display in a first mode;

means for detecting a navigation event; and means for automatically displaying airspace navigation information for the aircraft on the display in the first mode and at least one additional mode, in response to the navigation event.

16. A computer readable medium capable of configuring a processor to perform a method for providing airspace navigation information, the method comprising:

displaying airspace navigation information for an aircraft on a display in a first mode;

detecting a navigation event; and automatically displaying airspace navigation information for the aircraft on the display in the first mode and at least one additional mode, in response to the navigation event.

* * * * *